United States Patent
Guo et al.

(10) Patent No.: US 7,129,944 B2
(45) Date of Patent: *Oct. 31, 2006

(54) MACROSTRUCTURE MODELING WITH MICROSTRUCTURE REFLECTANCE SLICES

(75) Inventors: Baining Guo, Bellevue, WA (US); Stephen S. Lin, Haidian District (CN); Heung-Yeung Shum, Bellevue, WA (US); Ying-Qing Xu, Beijing (CN); Yanyun Chen, Haidian District (CN)

(73) Assignee: Microsoft Corporation, Redwood, WA (US)

( * ) Notice: Subject to any disclaimer, the term of this patent is extended or adjusted under 35 U.S.C. 154(b) by 96 days.

This patent is subject to a terminal disclaimer.

(21) Appl. No.: 11/000,607

(22) Filed: Dec. 1, 2004

(65) Prior Publication Data

US 2005/0099421 A1    May 12, 2005

Related U.S. Application Data

(63) Continuation of application No. 09/928,257, filed on Aug. 10, 2001, now Pat. No. 6,961,058.

(51) Int. Cl.
*G06T 15/60* (2006.01)

(52) U.S. Cl. ............... 345/426; 345/427; 345/582; 345/583; 345/592; 345/649; 345/424

(58) Field of Classification Search ............ 345/419, 345/426, 424, 582, 427, 649, 583, 592
See application file for complete search history.

(56) References Cited

U.S. PATENT DOCUMENTS

| 5,471,565 A | 11/1995 | Tsujido et al. |
| 6,018,423 A | 1/2000 | Takahashi |
| 6,246,416 B1 | 6/2001 | Stam |

OTHER PUBLICATIONS

Groller et al.; "Modeling and Visualization of Knitwear"; IEEE 1995, pp. 302-310.
Neyret; "Modeling, Animating, and Rendering Complex Scenes using Volumetric textures", IEEE 1998, pp. 55-70.
Westin et al., "Predicting Reflectance Functions from Complex Surfaces", ACM 1992.
Hanrahan, "Reflection from Layered Surfaces due to Subsurface Scattering", ACM 1993, pp. 165-174.

*Primary Examiner*—Kimbinh T. Nguyen
(74) *Attorney, Agent, or Firm*—Lee & Hayes, PLLC

(57) ABSTRACT

A method and system for efficient synthesis of photorealistic free-form knitwear, where a single cross-section of yarn serves as the basic primitive for modeling entire articles of knitwear. This primitive, called the lumislice, describes radiance from a yarn cross-section based on fine-level interactions, including occlusion, shadowing, and multiple scattering, among yarn fibers. By representing yarn as a sequence of identical but rotated cross-sections, the lumislice can effectively propagate local microstructure over arbitrary stitch patterns and knitwear shapes. This framework accommodates varying levels of detail and capitalizes on hardware-assisted transparency blending. To further enhance realism, a technique for generating soft shadows from yarn is also introduced.

23 Claims, 10 Drawing Sheets

Fig. 12a 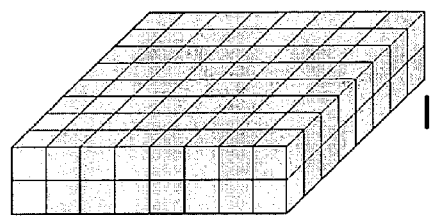 Fig. 12b 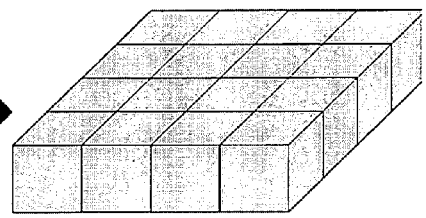
Fig. 16a 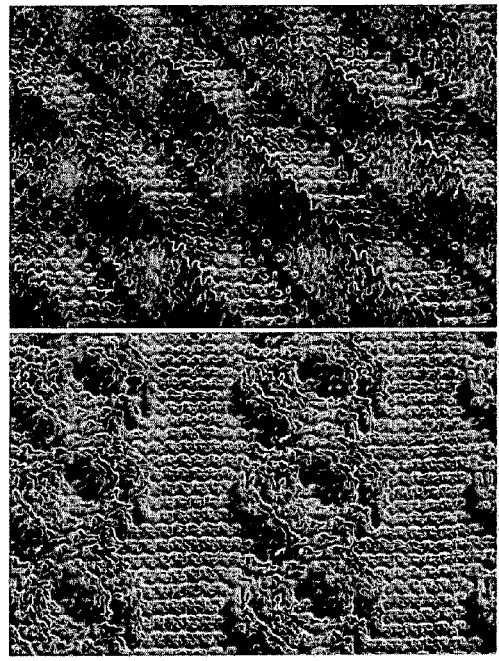 Fig. 16b 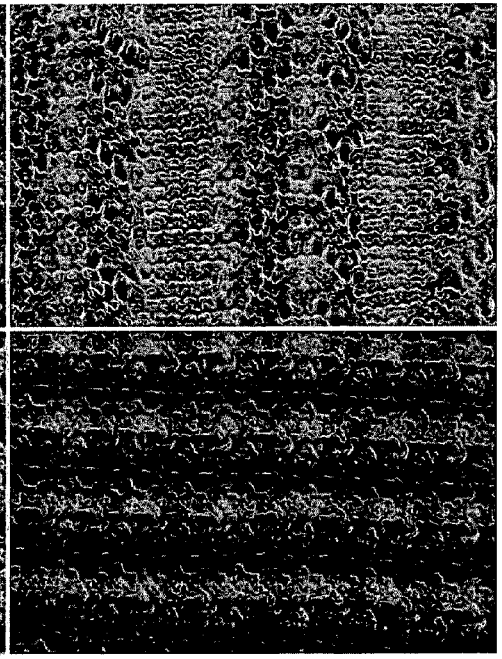
Fig. 16c Fig. 16d

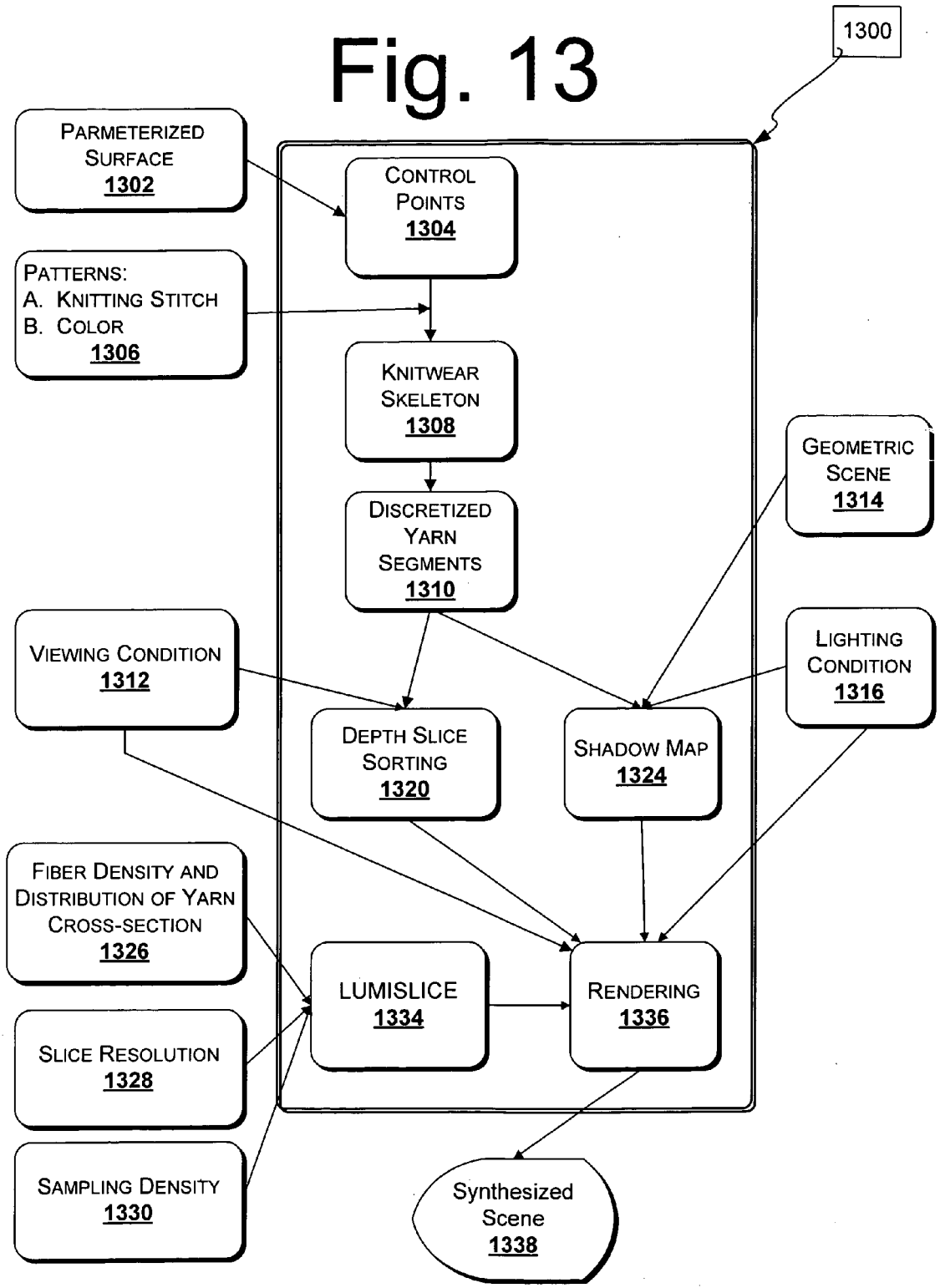

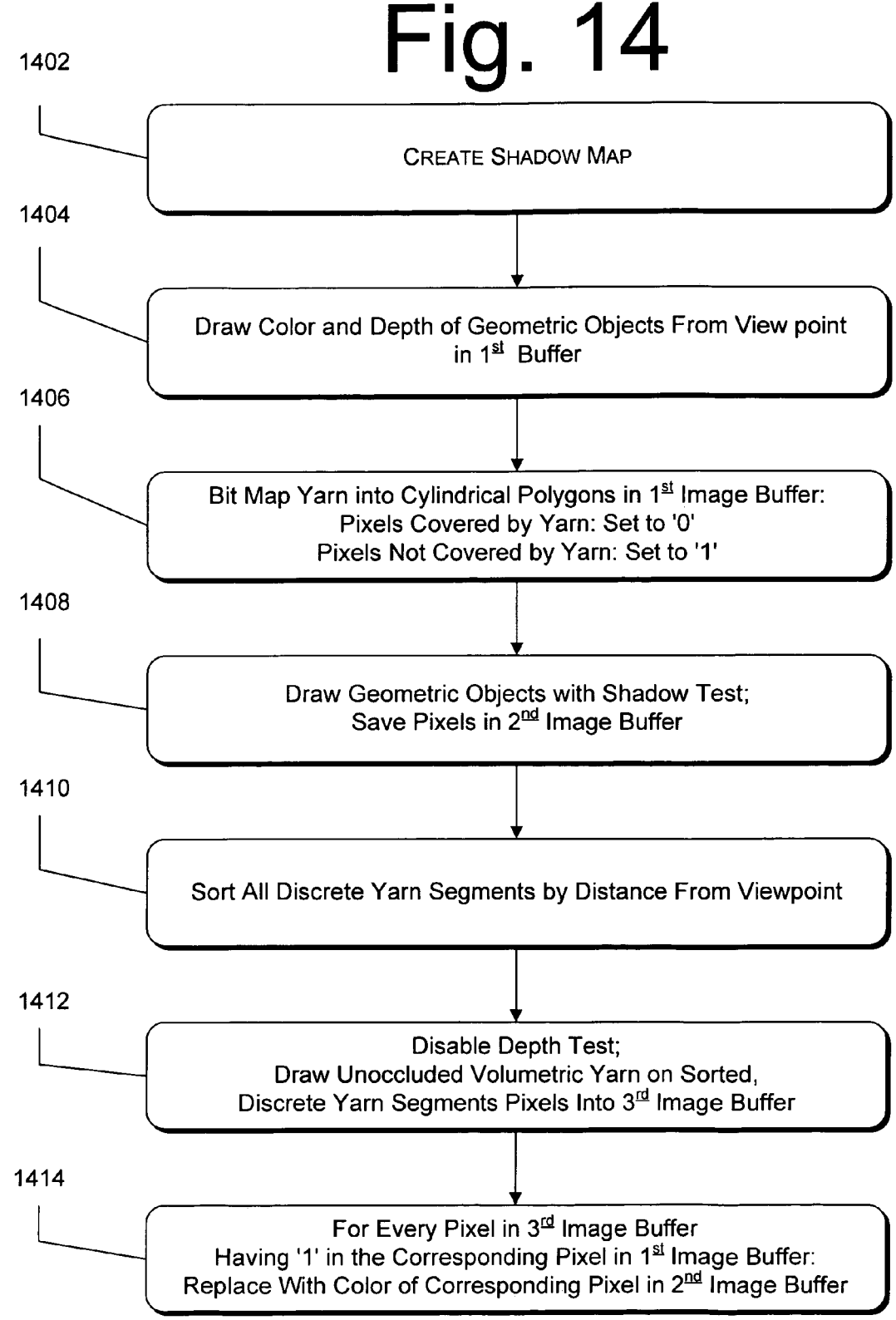

Fig. 15a
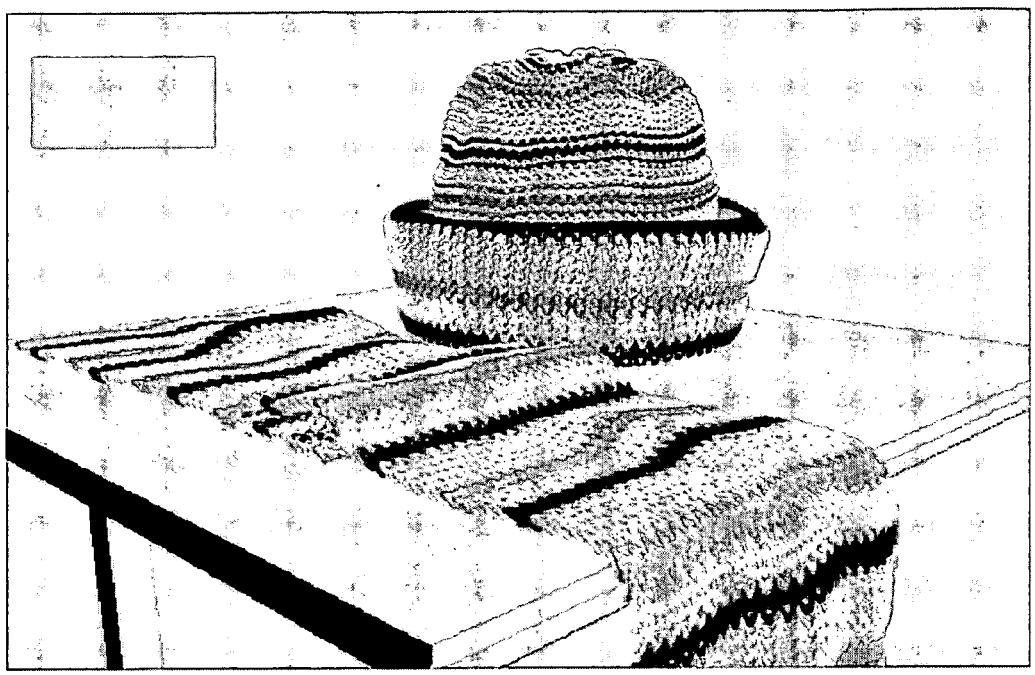
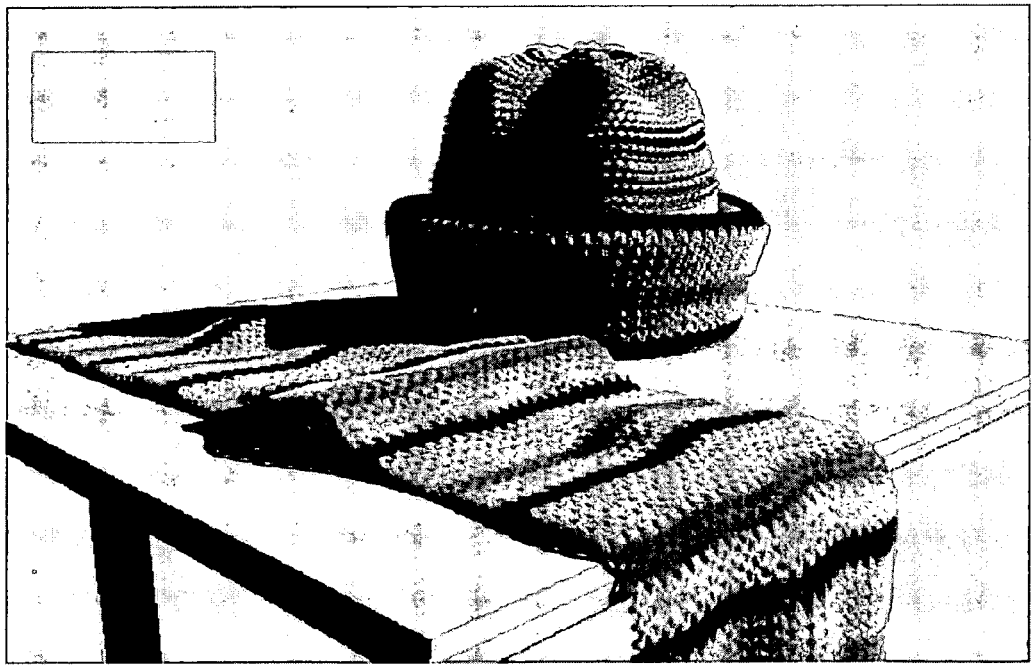
Fig. 15b

MACROSTRUCTURE MODELING WITH MICROSTRUCTURE REFLECTANCE SLICES

RELATED APPLICATIONS

This application is a continuation application of U.S. patent application Ser. No. 09/928,257 filed Aug. 10, 2001, now U.S. Pat. No. 6,961,058, entitled "Macrostructure Modeling With Microstructure Reflectance Slices," to Guo Baining et al.

TECHNICAL FIELD

This invention relates generally to three-dimensional (3D) modeling, and more specifically to modeling of macrostructure objects composed of elongated fibers, such as knitwear and hairpiece modeling.

BACKGROUND

Textiles and clothing are part of everyday life. As such, realistic rendering of these articles has been an active area of computer graphics research for over a decade. In particular, modeling and rendering of knitwear poses a considerable challenge. Knitwear is constructed by spinning raw fibers into yarn. The yarn is then knitted into fabric based on a stitch pattern, and may optionally include a color pattern as well. The knitted fabric is then sewn into the desired clothing, such as a hat, scarf, or other type of clothing.

One obstacle to realistic knitwear generation is the complicated microstructure of yarn. Close examination of yarn reveals countless thin fibers which give knitwear a fuzzy appearance. In order to be accurate, a computer rendering of a close-up view of knitwear should show fuzzy yarn fibers. Improper rendering of delicate fuzzy yarn fiber structures can result in aliasing that causes a scene to look artificial. Rendering a down-like covering with existing techniques is inadequate and cumbersome in that its appearance changes in detail with different viewing distances.

Another difficulty presented by knitwear is its variations in shape. For knitwear lying flat, its microstructure has been efficiently displayed using prior art volume-rendering techniques; however, the only known techniques for rendering free-form knitwear with microstructure utilize Gouraud-shaded triangles, which was presented by H. Zhong, Y. Xu, B. Guo, and H. Shum, in the publication titled "Realistic and Efficient Rendering of Free-Form Knitwear", published in the Journal of Visualization and Computer Animation, Special Issue on Cloth Simulation, in February 2001 (Zhong et al.). Techniques disclosed in Zhong et al., however, do not accurately handle close-up views.

Curved ray tracing, which is computationally expensive, does not effectively deal with multiple scattering that is especially evident on light-colored yarn. Curved ray tracing has a high rendering cost, and users must build different volumetric textures for different knitting patterns. This makes it difficult to model knitwear with advanced stitching patterns. Also, difficulties arise when the knitwear is severely deformed.

To avoid the high cost of ray tracing, volumetric objects can be rendered by hardware-aided texture mapping with transparency blending. Limitations arise, however, from the use of graphics hardware. Graphics hardware in general cannot compute the shading or shadowing for each individual texture pixel, with the exception of the GeForce 3 graphics hardware model that is provided through the NVIDIA Corporation having a place of business at 2701 San Tomas Expressway, Santa Clara, Calif. 95050, and which can do per-pixel lighting but cannot capture multiple scattering nor the attenuation effect of light passing through yarn. If a two dimensional (2D) alpha texture is employed, the volumetric texture can be split into slices parallel to the viewport and sorted from far to near for accurate blending computation. Splitting and sorting are solvable, but if shading and shadowing cannot be accurately computed according to the lighting and viewing conditions of the volumetric texture, the rendering result would likely appear artificial. A way to achieve realistic shading effects is to compute the results of all possible lighting and viewing conditions offline, and save them in a volumetric texture data structure. A moderately complex scene, however, requires a prohibitive amount of storage and computation resources.

Unlike woven fabrics, which can be well represented by specialized bidirectional reflectance (BRDF) models, knitwear is characterized by a macroscopic stitch structure that requires an explicit model of the knitting pattern and geometry. The microstructure of knitted yarn typically consists of a large number of thin fibers, where the size of yarn and stitches exceeds that of thread, thus precluding representation by BRDF models. Currently there are no convenient techniques for comprehensive photorealistic synthesis of knitwear.

Photorealistic rendering of a material that is arranged repetitively into a macrostructure poses another problem when fine-level interactions are apparent among the relatively smaller elements that make up the material. Examples of these smaller elements that make up a material include fibers in a yarn that have been knit into knitwear, or individual hairs that are on a human head. These relatively smaller elements exhibit reflection and transmission interactions, which include shadowing, occlusion, and multiple scattering, which need to be considered for physically realistic rendering. Such details should moreover be visible over the entire object and change in appearance for varying viewing distances. Additionally, rendering methods should accommodate arbitrary forms of the material. These difficulties together have not been addressed by previous rendering approaches so as to achieve photorealistic rendering of knitwear that efficiently handles free-form surfaces, varying levels of detail from different viewing distances, and complex stitch geometry.

SUMMARY

A computer rendering system and method are presented for moving a planar plurality of reflection points perpendicular with respect to an axis to render an image of the plurality of reflection points at a plurality of positions with respect to the axis. Also presented are a system and method for rendering a macrostructure having a repetitive microstructure. Examples of such a macrostructure are knitwear, hair, carpets, and weaves. The repetitive microstructures are defined herein in terms of reflectance slices or "lumislices". A reflectance slice or lumislice is a basic primitive for photorealistic rendering of such macrostructures. The lumislice, which represents a typical cross-section of a material of which an object is composed, represents light radiance from a yarn cross-section. Based upon the repetitive structure of yarn, articles of knitwear may be composed of lumislices.

Implementations of the system and method account for light reflection and transmission details by modeling the entire object as a collection of lumislices. A lumislice models the fine-level light reflections and transmissions among the to-be-rendered material's individual elements. The lumislice can then be swept along the material that makes up the object to be rendered to produce photorealistic renderings. The lumislice effectively propagates the material's local microstructure over the entire object to produce photorealistic renderings that accommodate varying levels of detail. As the lumislice represents a microstructure element of the larger material that makes up the object, the lumislice has the flexibility to be incorporated into any global shape. The lumislice, as a semi-transparent texture slice, can be used to render fuzzy objects such as animal hair, e.g. fur, as well as human hair via sweeping the object with the lumislice and then rendering a resultant sampled collection of lumislices.

BRIEF DESCRIPTION OF THE DRAWINGS

Generally, the same numbers are used throughout the drawings to reference like elements and features.

FIG. 9a is planar view of a lumislice, FIG. 9b is a sample of three (3) of the lumislice of FIG. 9b in perspective view, and FIG. 9c is sweeping sampling of the lumislice of FIG. 9a along and about an axis.

FIGS. 12a–12b characterize representations of levels of resolution of knitwear rendered using a lumislice implementation.

FIG. 13 is a block diagram of a system architecture for rendering a macrostructure knitwear object from microstructure lumislice primitives.

FIG. 14 is a flow chart depicting actions for an implementation of a method for rendering a scene of a macrostructure knitwear object with microstructure lumislice primitives.

FIGS. 15a and 15b are computer renderings of a knitwear hat and scarf without and with shadows, respectively.

FIGS. 16a–16d are computer renderings using a lumislice implementation of a range of complex stitching patterns that include soft shadows.

DETAILED DESCRIPTION

Implementations of the present invention employ a microstructure element to render a macrostructure object. In one implementation, knitwear is a macrostructure object and the microstructure element is a reflectance primitive for yarn that represents a microstructure in a manner that allows for various levels of detail and hardware-assisted rendering.

Although patterns of knitted yarn in knitwear can be complex, they are composed of a single basic element. For a given type of yarn, the distribution of fibers for each cross-section or slice is similar. An implementation to render knitwear models a yarn strand by winding a fixed two dimensional (2D) fluff distribution along the path of the yarn so as to synthesize knitwear from a single volumetric yarn cross-section. To exhibit realism, this cross-section incorporates fine visual effects, such as self-occlusion, self-shadowing, and multiple scattering. For different levels of detail, the resolution of this slice can be varied with smooth visual transitions. The slice is compactly represented in 2D as a single thin volumetric layer and can be computed offline. In addition, this structure is amenable to transparency blending for efficient rendering.

1. Lumislice-based Rendering

Implementations of the invention directed to knitwear generated from a lumislice include both modeling and rendering. With respect to modeling, two components are included which are a lumislice and a stitch skeleton. FIGS. 1–6 provide an overview of the rendering process through the depiction of the geometric construction of a knitwear article.

1.1 Object Synthesis

Figure 1:
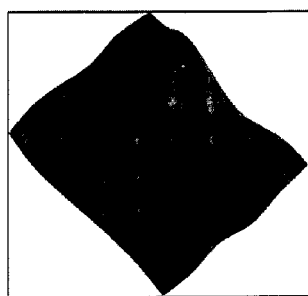
FIG. 1 is a computer rendering of a nonplanar or free form parameterized surface.
Figure 2:
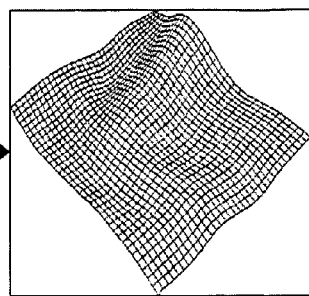
FIG. 2 is a computer rendering of linked control points that have been determined for the shape of the free-form parameterized surface seen in FIG. 6.
Figure 3A:
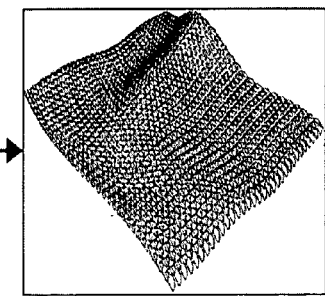
FIG. 3 is a computer rendering of the free-form surface with control points seen in FIG. 2, where the elongated strands connecting the control points have a stitching pattern placed there over so as to form a knitwear skeleton.

FIGS. 1–3a depict the geometric construction of a knitwear article. For the desired free form, or nonplanar, parameterized surface shown in FIG. 1, the shape of the knitwear is defined by control points as seen placed in FIG. 2. Each control point is connected to other control points by a plurality of axes. The defined control points are also used to outline stitch patterns, such that the control points are fit with a chosen stitching pattern, as seen in FIG. 3a, thereby delineating a knitwear skeleton. As such, the knitwear skeleton defines the yarn path.

Figure 3B:
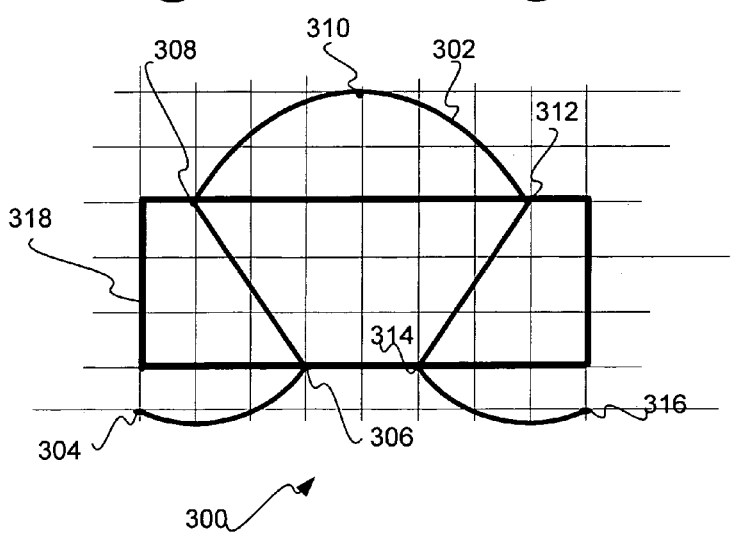

The knitwear skeleton seen in FIG. 3a is a macrostructure that is generated by an implementation of the invention. The macrostructure effectively defines a 3D surface with the control points, each being at an intersection of two of the axes. The 3D surface can be further partitioned into quadrilaterals in accordance with the object to be modeled and corresponding to the stitch pattern. An example of this partitioning is seen in FIG. 3b where a quadrilateral 318 is seen and about which a stitch pattern 300 is defined. Quadrilateral 318, which is intended to be represented upon a 3D surface, connects several key points of stitch pattern 300. Each key point of stitch pattern 300 occurs at a control point. Several of the key points serve as a terminal end for a curved segment of stitch pattern 300.

In stitch pattern 300 of FIG. 3b, quadrilateral 318 has a corresponding stitch 302. Stitch 302 is defined by curved segments connecting the six key points of the stitch 302. The point 304 is a key point of the stitch immediately to the left of the stitch 302, which is not specifically called out in FIG. 3b. Connecting the point 306 with the point 304 connects the stitch 302 with another stitch.

The key points of all of the quadrilaterals determine the overall shape of the knitwear model. Since the control points have respective physical relationships, so do the key points. As such, the relations among all the key points preserve the knitwear topological connections during stretching and deformation. As the underlying surface changes shape, each stitch loop also changes shape depending on its location in the knitwear. At the same time, each loop remains correctly interlocked with neighboring loops.

Both a color pattern and a stitch pattern can be applied to the three-dimensional surface of the macrostructure in accordance with the knitwear skeleton seen in FIGS. 3a and 3b. In this case, each quadrilateral 318 of stitch pattern 300 would have a color from the color pattern applied thereto. The application of a color from a color pattern is optional and the knitwear upon the knitwear skeleton can be rendered to be monochromatic.

A variety of techniques, other than that disclosed herein, can be used to define the stitch and color patterns of the macrostructure that defines an article of knitwear. One such technique, discussed above, is that of Zhong et al.

Figure 4:
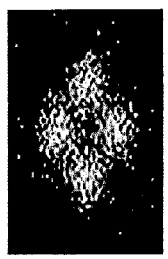
FIG. 4 is a top planar view rendering showing the two dimensional appearance of a lumislice, and particularly showing a plurality of points in varied density.
Figure 5:
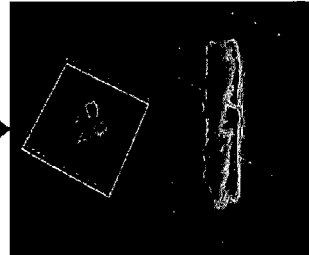
FIG. 5 is a perspective view on the left of a computer rendering of the appearance of a single lumislice, where the perspective view on the right shows a sampling of the lumislice that has been rotated and translated along an axis.

The knitwear's reflectance properties are determined from FIGS. 4–5. In FIG. 4, a cross-sectional fluff density distribution is shown as a visual representation of a lumislice. The appearance of the lumislice is as several clusters of points, or fluff, in a two dimensional (2D) area or plane. The density of the points is seen to vary over the 2D plane. The computation of the lumislice is to be used as the basic structural primitive for an entire piece of knitwear. This computation is made by first measuring or choosing a density distribution of the yarn fibers seen in FIG. 4, and then computing the lumislice. The knitwear skeleton seen in FIG. 3 is divided into yarn segments. The reflectance characteristics of these yarn cross-sections are each represented by the lumislice, which is then stored in a lookup table of 2D transparency texture. The yarn segments are further divided into volumetric slices as seen in FIG. 5. The volumetric slices are then rendered according to lumislice lighting and viewing conditions using hardware-aided transparency-blending application program interfaces (APIs). The volumetric lumislices seen in FIG. 5 are swept and rotated along the paths of the knitwear skeleton seen in FIG. 3 to form the large nonplanar knitwear fabric seen in FIG. 6. Soft shadows can optionally be added, as in FIG. 6, for greater realism.

1.2 The Lumislice

The lumislice represents radiance from a yarn cross-section and arises from an observation that, based on the repetitive structure of yarn, articles of knitwear may be composed entirely of lumislices. This suggests a local and global structural hierarchy that can be formed for yarn to facilitate efficient photorealistic rendering. On the local hierarchy, there will be fine-level interactions among yarn fibers that include occlusion, shadowing, and multiple scattering. The results of their reflectance interactions, which can be modeled for a yarn cross-section, when so modeled are called a 'lumislice'. An assumption can be made that the fluff on all cross-sections that are to be rendered follow the same fluff density distribution. On the global hierarchy, because of the repetitive nature of knitted yarn and its known path along a skeleton, knitwear can be represented as a collection of identical lumislices in various positions and orientations. It is this detailed but flexible quality that gives the lumislice much utility. Local microstructure can be closely represented in the lumislice, yet it can be globally disseminated to all points of a knitwear in that it does not introduce restrictions on the global structure of the knitted yarn.

Enhanced realism can be achieved with a shadow map presented herein for yarn that is integrated into an implementation for soft shadow generation. Inclusion of such shadows can allow individual yarn fibers to be distinguished, as deep shadow maps have done for hair.

Figures 7A, 7B, 7C, 7D:
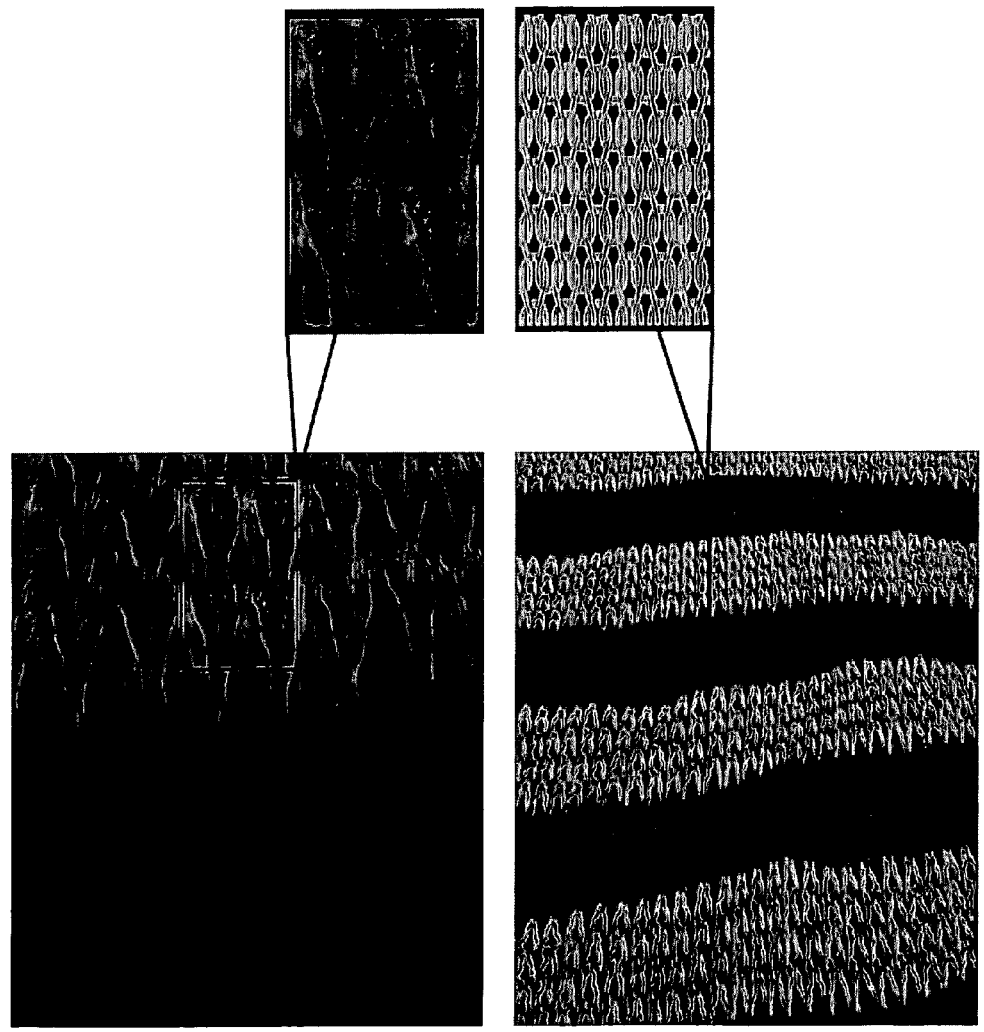
FIGS. 7a–7d are, respectively, farther distance computer renderings of knitwear fabric that has been synthesized using the lumislice.

Examples of lumislice-based renderings of a knitted fabric are seen in FIGS. 7a and 7b for different viewing distances, where FIGS. 7a is the closest view and FIG. 7d is the furthest view. The closest view in FIG. 7a exhibits the delicate fluff and fuzzy characteristics of knitted yarn. FIG. 7a depicts a section that is taken from the farther away view of FIG. 7b. FIG. 7c is a section of the still farther away view in FIG. 7d that is a rendering of variable macrostructure that particularly illustrates irregular stitches. The efficient and effective generation of this range of details distinguishes lumislice-based rendering.

The lumislice may furthermore be extended to other materials that are made up of subpixel elements, such as hair, carpet or distant foliage. Applications of photorealistic knitwear rendering include web-based display of clothing products and fabric animation on moving characters. Automated generation of knitwear would also be desirable for motion pictures depicting anthropomorphized clothed furry animals, where fur and clothing structures would otherwise require significant labor to be synthesized.

Figure 6:
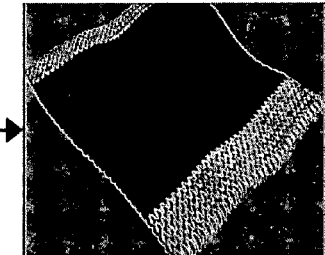
FIG. 6 is a computer rendering of a knitted fabric after the lumislice sampling of FIG. 4 has been swept and rotated along the paths of the stitching pattern of the knitwear skeleton seen in FIG. 3, and to which soft shadows have been added.
Figures 9A, 9B, 9C:
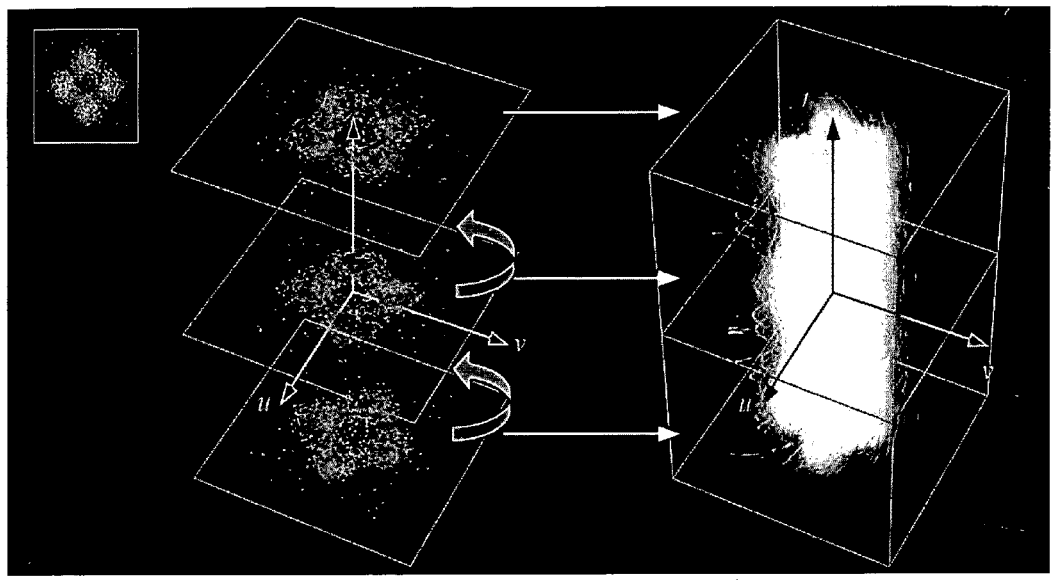
FIGS. 9a–9c are computer renderings, where
Figures 8A, 8B:
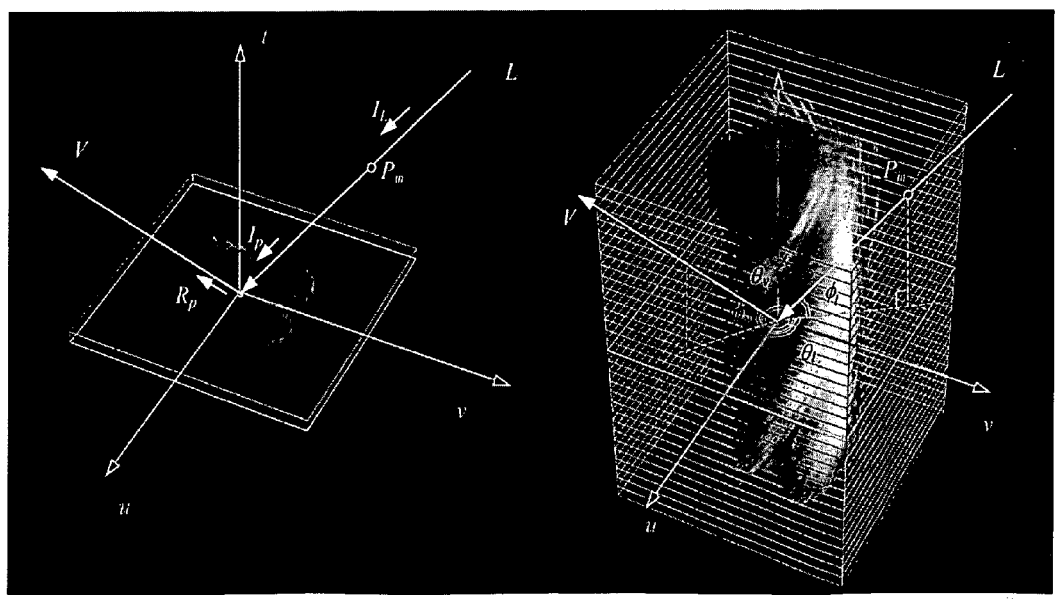
FIGS. 8a and 8b are perspective views of a computer rendering showing a single lumislice on the left and a sampling of lumislices on the right that have been rotated and translated along an axis.

FIGS. 8a–8c and 9a–9b shows a perspective view of a lumislice that has been sampled while it is rotated about and translated relative to an axis 't'. It can be seen in FIGS. 8c, 9a, and 9b that the combined sampled lumislices give each point on the 2D plane the appearance of an elongated strand or fiber. FIG. 8b shows an example of three (3) periodic samples of a lumislice that are taken while rotating about and translating along axis 't'. When periodic samples of the lumislice are taken as the lumislice is rotated about axis 't' while being translated along axis 't', FIGS. 8c, 9a, and 9b show that the combination of sampled lumislices assumes the appearance of multiple fibers in a yarn. Yarn so rendered can be arranged into geometric, repetitive shapes, such as stitches so as to form a larger knitwear fabric, as seen in FIG. 6. The knitwear fabric seen in FIG. 6 can then be used in a computer rendering over a non-planar free form surface for a physically based animation, such as the knitwear cap and scarf seen in FIGS. 15a–15b, which may be formed by lumislices swept along the various paths of complex stitching as is seen in FIGS. 16a–16d. The technique for the presented renderings will now be discussed.

The Lumislice Computation

The lumislice is the fundamental structure implemented for knitwear rendering. Attributes of the lumislice facilitate the rendering of knitwear at different viewing distances while maintaining appropriate macrostructure and macrostructure features. For a given illumination direction, the lumislice is computed as a light field for a yarn cross-section. The lumislice characterizes attributes of a cross-sectional slice of yarn that is divided into voxels.

Each lumislice voxel has two associated quantities. The first quantity of each lumislice voxel is the opacity value of its yarn fluff, which is a value derived from the fluff density distribution of the yarn fibers as illustrated in FIG. 9a, and assumes that each lumislice voxel is uniform for all cross-sections of the given yarn. For yarns with different fluff characteristics, its corresponding density distributions are used instead. The second quantity is a shading or Volume Reflectance Function (VRF), which represents the exhibited brightness of the voxel when viewed and illuminated from various directions. The density values can be measured from a representative cross-section of yarn, and the VRFs are computed from these densities using an emission-absorption model for volume illumination by sampling different viewing and lighting directions.

Each of these voxels has an associated four-dimensional array that contains its opacity and its voxel reflectance function (VRF). The VRF represents the brightness of a voxel viewed from direction $V(\theta_v, \phi_v)$, seen in FIG. 9b, when illuminated by a unit intensity light from direction $L(\theta_l, \phi_l)$. The VRF differs from the traditional notion of a bidirectional reflectance function (BRDF) in that it accounts for the attenuation of incident light passing through the surrounding yarn. Using the VRF allows the precomputation of the effects of the surrounding yarn. A cross-section of one yarn, as shown in FIG. 9a, is composed of lumislice voxels.

Different kinds of yarn can be incorporated into a lumislice implementation by employing different cross-sectional fiber density distributions. Additionally, multiple scattering is calculated iteratively from reflections among neighboring voxels. The lumislice is precomputed and stored in tables such that hardware-assisted transparency blending can accelerate the rendering. Different resolutions of precomputed lumislices can be displayed depending upon the various levels of detail that arise from viewing a knitwear article from different distances.

The single computed lumislice could be used for generating entire strings of yarn as exhibited in FIG. 9b. Simply by rotating the lumislice along the path of a yarn, arbitrary segments can be synthesized. It should be noted that all lumislices that comprise the yarn are identical in structure and that the yarn can follow any desired path. In this way, the fine-level reflectance details of yarn that are captured within the lumislice can easily be spread over an entire article of knitwear, and there are no restrictions on the shape of the knitwear.

An implementation of the VRF is presented in terms of $R_p$, the outgoing radiance from voxel p. Three primary physical elements factor into the reflectance at a voxel p: the fluff density $\rho_p$, the shading model $\psi$ of yarn, and the incident light distribution $I_{msp}$ that results from multiple scattering among neighboring voxels N. The emission intensity from a voxel in principle can also affect a VRF, but this quantity for yarn is zero. These factors influence $R_p$ according to $$R_p = \rho_p \psi \left( I_p + I_L \sum_N I_{msp} \right), \tag{1}$$

where $I_L$ is the light intensity and $I_p$ is its attenuated intensity upon reaching p, as shown in FIGS. 9a and 9b. A shading model $\psi$ for diffuse reflection is used, and multiple scattering will be later addressed. An emission-absorption model of volume illumination, $I_p$, may be expressed as $$I_p = I_L e^{-\gamma \sum_{r=p}^{P_{in}} \rho_r}, \tag{2}$$

where $P_{in}$ is the point of light entry into the yarn bounding box, $\gamma$ is a light transmission factor in the emission-absorption model, and voxel dimensions are unit length. Then Eq. (2) can be substituted into Eq. 1 to produce $$R_p = \rho_p \psi I_L \left( e^{-\gamma \sum_{r=p}^{P_{in}} \rho_r} + \sum_N I_{msp} \right). \tag{3}$$

$R_p$ can then be restated in terms of the spherical angles in FIG. 4:

$$R_p(\theta_l, \phi_l, \theta_v, \phi_v) = I_L C_p(\theta_l, \phi_l, \theta_v, \phi_v), \tag{4}$$

where $$C_p(\theta_1, \phi_1, \theta_v, \phi_v) = \rho_p \psi(\theta_1, \phi_1, \theta_v, \phi_v) \left[ e^{-\gamma \sum_{r=p}^{P_{in}} \rho_r} + \sum_{i \in N} I_{msp}(\theta_i, \phi_i) \right]. \tag{5}$$

Here, $C_p$ is the VRF, which is a 4D function of $\theta_l, \phi_l, \theta_v, \phi_v$. It can be approximately represented by a 4D color array after discretization of the four angles, where the discretization increments are determined by the accuracy required. For all lumislices used in one implementation, the longitude angle $\theta \in [0, 2\pi]$ and altitude angle $\phi_i \in [-\pi/2, \pi/2]$ are discretized into 32×21 directions, such that the 2D lumislice is computed from a 3D swept rotation of yarn cross-sections. In normal situations, the distance between the knitwear and the light source greatly exceeds the radius of the knitted yarn, so the assumption of parallel illumination is made. The spacing of the lumislices along yarn segments is related to the resolution of the lumislice, which is presented in Subsection 1.2.4.4, titled "Level of Detail". For greater realism, multiple scattering between voxels is calculated to simulate light scattering among the fibers. This effect is quantified in the $I_{msp}$ term, which aggregates the reflected intensity from neighboring voxels. For a neighboring voxel N from direction $(\theta_i, \phi_i)$, its contribution to the multiple scattering towards p is computed from Eq. 4 as $$I_{msp}(\theta_i, \phi_i) = \rho_N \psi(\theta_i, \phi_i, -\theta_i, -\phi_i) e^{-\gamma \sum_{r=N}^{P_{in}} \rho_r}. \tag{6}$$

Although multiple scattering could be computed iteratively from the surrounding voxels, a first-order approximation with adjacent voxels is adequate. The effect of the multiple scattering component on yarn rendering is visually beneficial for achieving realistic renderings.

For additional simplification, the specular component of the VRF is ignored in one implementation, resulting in a view-independent reflectance function. This allows $C_p$ to become a 2D function, and consequently the computational costs and storage requirement are significantly reduced. All implementation of lumislices in this one implementation consider only the diffuse effect.

The lumislice of a given yarn is precomputed and stored in tables, with the VRF in a 2D Red-Green-Blue (RGB) color table indexed by $(\theta_L, \phi_L)$ and the opacity in an alpha table.

1.2.2 Volumetric Yarn and Radiance Calculation

Since the same lumislice, as seen in FIG. 8a, represents all cross-sections of a knitted yarn, it is rotated and translated along the yarn path to form the yarn volume, as shown in FIGS. 8c, 9a, and 9b. The radiance R of the knitwear at a given image pixel from a viewpoint can be computed as $$R = \sum_{p=P_{near}}^{P_{far}} e^{-\gamma \sum_{s=P_{near}}^{p} \rho_s} \cdot R_p, \qquad (7)$$

where $R_p$ is calculated in Eq. 1.

When the knitwear is rendered, all yarn segments are subdivided into a series of volumetric cross-sections, each represented by the lumislice. When a slice is drawn, its location, its local coordinate system <t,u,v>, the light source position and the viewpoint together determine the reflection angles $\theta_L, \phi_L, \theta_v, \phi_v$, as shown in FIG. 9b. These angles, specifically only $\theta_L$, $\phi_L$, are then used to index the 2D color table of the lumislice. This color texture and the opacity table of the slice together form the Red-Green-Blue-Alpha (RGBA) transparency texture, which is rendered by the texture mapping and transparency-blending functions of standard graphics APIs.

1.2.3 Pattern Stitching

The path of the yarn, and likewise the arrangement of the lumislices, is given by the process of pattern stitching. In pattern stitching, a knitwear skeleton is built according to a given object surface and stitch pattern. This method is detailed in Zhong et al. and is briefly described here. The knitwear skeleton is a network of interlocking mathematical curves in three dimensions (3D) which interpolate control points that are placed according to the desired stitch pattern.

An important feature of control points is that they simplify modelling and editing of advanced stitch patterns. An additional advantage of this framework is the modeling of interactions among yarn loops. This free-form structure for knitwear complements implementations of the lumislice method for realistic and efficient rendering.

1.2.4 Rendering

With stitching, the knitwear skeleton is created on a free-form surface. The yarn along the skeleton is divided into a series of short, discretized straight segments with a twisting angle $\phi$. The frame <t,n,b> is then defined for determining a local coordinate system <t,u,v> for each slice.

With these slices, the rendering issues of depth sorting, slice partitioning, shadow casting, and levels of detail are described. Subsections 1.2.4.5–1.2.4.6 describe an implementation of a rendering system architecture and algorithm.

1.2.4.1 Sorting Discretized Yarn Segments

For the blending computation, the volumetric yarn slices must be drawn from far to near, thus requiring slice sorting before rendering. While the number of slices can be extremely large for complex scenes, implementations involve sorting the yarn segments rather than the slices if the yarn segments are short. The view direction and the positioning of a yarn segment determine the orientation in which its slices are rendered.

1.2.4.2 Slice Partitioning

Figure 10C:
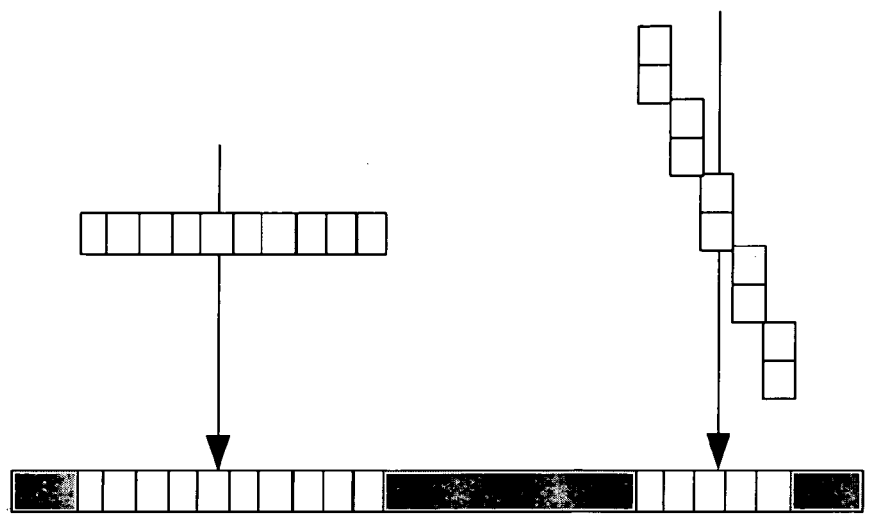
FIGS. 10a–10c depict partitioning of lumislices for transparency blending.
Figure 10B:
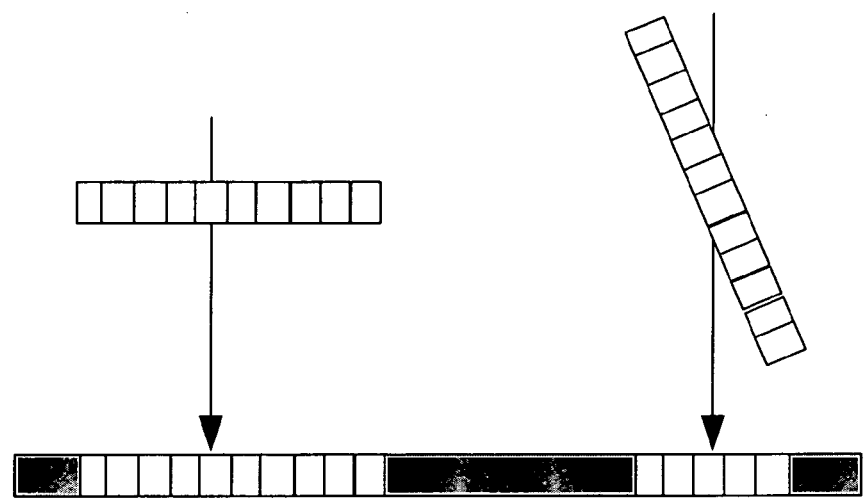
Figure 10A:
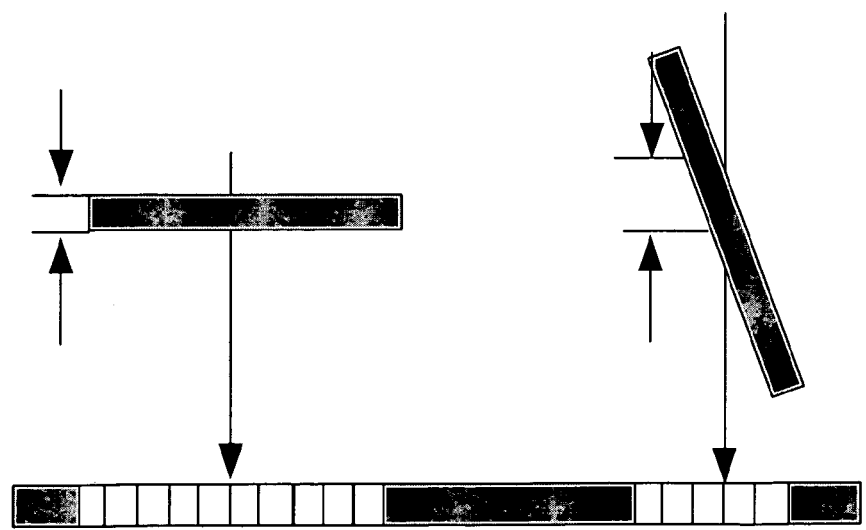

The transparency-blending function supported by graphics hardware performs its blending computation along slices parallel to the viewport. For knitwear, lumislices can have various orientations that differ greatly from that of the viewport. FIGS. 10a–10c illustrate partitioning of lumislices for transparency blending for an implementation, where each figure shows a slice on the left, a viewpoint direction arrow perpendicular to the screen, and top and bottom slices of different orientation relative to the respective screen in each figure.

In FIG. 10a, for the top and bottom slices with the same transparency texture, differences in orientation do not lead to different blending results if there is no slice partitioning parallel to the image plane. The two slices can have the same blending result even when they are aligned differently and consequently have different thicknesses with respect to the viewer. This disparity in thickness should in principle be rendered dissimilarly for semi-transparent surfaces.

In FIG. 10b, where the lower slice is partitioned according to a particular resolution, the blending result reflects the difference in the thickness between the two surfaces as seen from the screen. As such, FIG. 10b illustrates an approximate solution to the problem of FIG. 10A, where an implementation partitions each slice according to its resolution. Each of the resulting slice units is then rendered as a line, because polygons are taken to have zero thickness by the hardware. This would lead to slices not being rendered when they are perpendicular to the viewport.

In FIG. 10c, because of hardware discretization of the scene with regards to the viewport pixels, more than one voxel may map to the same screen pixel. The result would effectively be rendered as shown in FIG. 10c, where there may be more than one line projected to each pixel.

1.2.4.3 Shadows

Shadows, for which there are many well-known generation techniques, are one of the most important factors for realism. Shadows are particularly important for realistic rendering of knitwear because they not only indicate the spatial relationship between knitwear and other geometric objects, but also visually reveal the knitting pattern of yarns. The rendering of FIG. 15a that lacks shadows, when compared to the rendering of FIG. 15b that implements a shadow generation algorithm, exemplifies the significant effects of shadows on the rendered hat and scarf.

Deep shadow maps can deal with semi-transparent or sub-pixel objects such as hair, fur and smoke because they represent the fractional visibility through a pixel at all possible depths, rather than only a single depth value. This technique, however, can be incompatible with implementations of the lumislice because part of the light attenuation has been already computed and stored in the lumislice to provide better effects of yarn microstructure. The traditional shadow map is therefore extended to handle yarn, an object having a geometry that is not clearly defined. While shadows are important in 3D rendering, they need not be exact. As such, lumislice implementations use a rough shadowing technique that include two steps.

Like traditional shadow map techniques, the first step places a camera at the light source, making sure that all shadow generators and receivers are within the field of view. All objects except for knitwear are then projected to produce a shadow map containing a depth value. For knitwear, only the centerlines of yarns are projected to the shadow map. Thus the shadow map in one implementation will contain depth information of geometric objects and yarn centers.

Figure 11B:
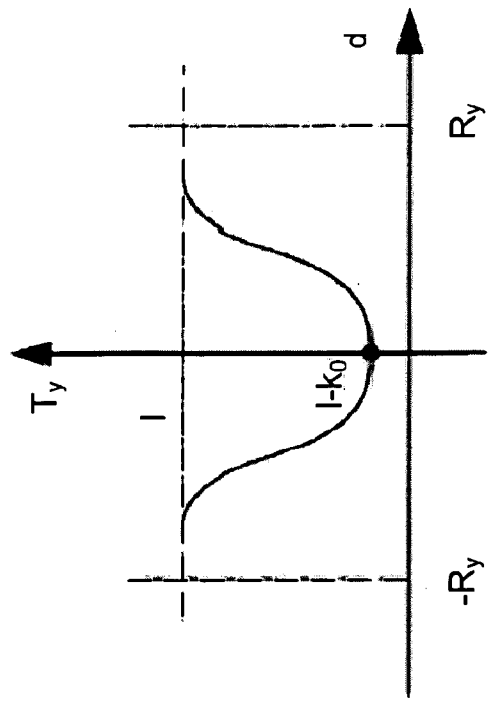
FIGS. 11a and 11b illustrate, respectively, a lumislice and its plot for transmission of light for soft shadows.
Figure 11A:
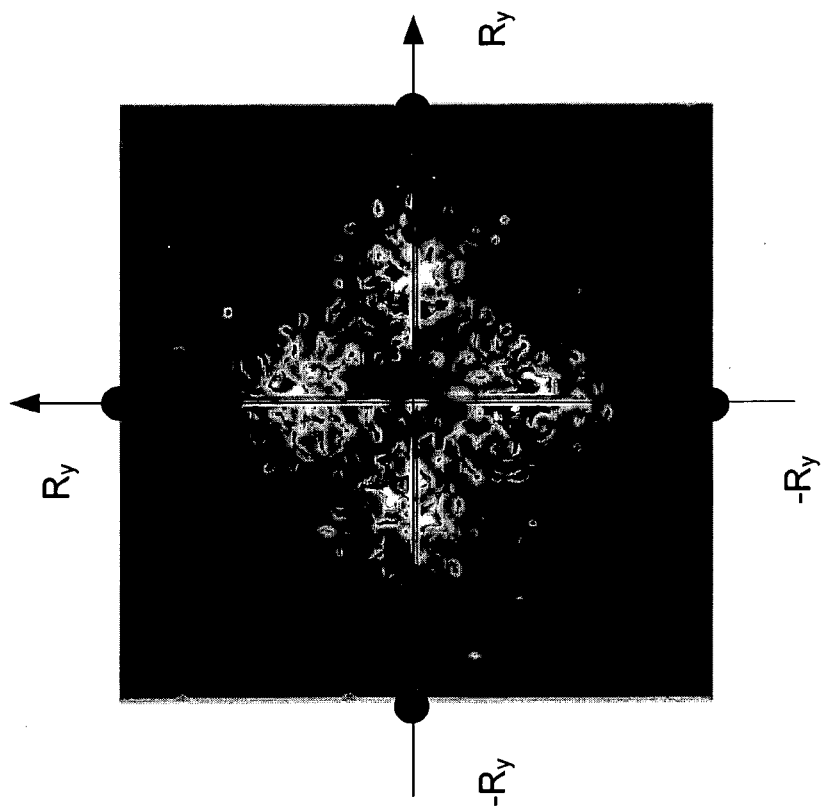

Next, referring to FIGS. 11a–11b, the effect range $R_y$ of yarn in the shadow map is computed according to the radius of yarn. This parameter is used to determine whether light is partially absorbed by the yarn before reaching more distant positions.

Finally, before a point p is rendered, it is projected onto the shadow map for shadow testing. If the projection result $p_s(x_s, y_s, z_s)$ indicates total occlusion by geometric surfaces, then it is in shadow. Otherwise, the yarn-occlusion test is performed as follows: on the shadow map, if the closest distance d from $(x_s, y_s)$ to the centerline of any yarn is smaller than $R_y$, light is partially absorbed by that yarn.

Given the fluff density distribution seen in FIG. 11a, which may be represented as 'ρ', the light transmission for distance d through voxels (d,i) of the lumislice is computed as $$T_y(d) = 1 - k_0 \frac{1 - \prod_{i=-R_y}^{R_y} e^{-\gamma p(d,i)}}{1 - \prod_{i=-R_y}^{R_y} e^{-\gamma p(0,i)}}, \tag{8}$$

where $k_o = 0.8$ and the voxel dimensions are empirically taken to be unit length.

Implementations of the lumislice-based method render knitwear by a volumetric yarn slice using hardware-aided transparency blending. Shadows cannot be calculated for every pixel on a texture if the alpha-texture is employed to render volume-represented objects. Thus the shadow test can be performed only at the slice vertices, and the result is blended to the lumislice by adjusting the texture brightness so that the shadow effect can be seen. If higher accuracy is required, such as for rendering close-up views, the slice could be divided into sub-slices so that shadow computation can be done at more points to improve the result quality.

1.2.4.4 Level of Detail Representation

To handle a wide range of viewing distances, a view-dependent level of detail representation of the lumislice is utilized to reduce the computational cost, to ensure smooth visual transitions, and to reduce rendering error. When the viewing distance changes, the projection size and visible features of a yarn slice on the screen should change accordingly. A lumislice of fixed resolution can cause errors when there is no simple method for determining proper opacity values, even though the color values of the lumislice can be obtained by using a mip-map. For this reason, lumislices of different resolutions can be precomputed. Then, a rendering can be made of each precomputed slice that is the most appropriate for its current viewing condition.

For decreasing resolution of the lumislice, the lumislice unit of thickness should increase by the same factor. For instance, a low-resolution lumislice can be formed as the composite of two identical high-resolution lumislices. FIGS. 12a–12b depict lumislice levels of detail. To form the lower resolution lumislice of FIG. 12b, a high-resolution lumislice is doubled in thickness as of FIG. 12a, and then groups of eight (8) voxels are averaged according to Eq. 9 as follows. Locally, a voxel on a low-resolution slice can be computed from corresponding voxels in a high-resolution slice. A reasonable estimate of the low-resolution density ρ' is its average value, and a reasonable estimate of the color C' is a weighted average, as follows:

$$\rho' = \frac{\rho_1 + \rho_2 + \rho_3 + \rho_4 + \rho_5 + \rho_6 + \rho_7 + \rho_8}{8} \text{ and} \tag{9}$$

$$C' = \frac{C_1\rho_1 + C_2\rho_2 + C_3\rho_3 + C_4\rho_4 + C_5\rho_5 + C_6\rho_6 + C_7\rho_7 + C_8\rho_8}{\rho_1 + \rho_2 + \rho_3 + \rho_4 + \rho_5 + \rho_6 + \rho_7 + \rho_8}$$

where $C_1, C_2, C_3, C_4, C_5, C_6, C_7, C_8$ are colors of the high-resolution slice, and $\rho_1, \rho_2, \rho_3, \rho_4, \rho_5, \rho_6, \rho_7, \rho_8$ are densities of the high-resolution slice. Because of thickness doubling, the estimate of the transparency is $T' = (e^{-\gamma \rho'})^2$. For more accurate results when the resolution is below 8×8, the low-resolution lumislice can be formed by sampling the high-resolution lumislice.

The resolution for rendering a slice depends upon the projection area of the slice on the screen. For a projection whose dimensions are at the most m pixels, a lumislice with resolution 2n×2n is chosen such that n is an integer and $2^n \geq m$, to prevent aliasing. Although this implementation precomputes lumislices at intervals according to $2^n$, finer intervals may be implemented for more accuracy.

The unit length corresponding to the determined resolution also describes the thickness of the lumislice. Lumislice densities along yarn are determined by dividing yarn segments by these computed resolution units. In other words, if the lumislices are considered to be two-dimensional, the resolution unit describes the distance between lumislices along yarn segments.

1.2.4.5 Rendering System Architecture

FIG. 13 is a block diagram of an implementation of a lumislice system architecture 1300. The exterior components outside of the lumislice system architecture 1300 represent inputs (1302, 1306, 1312, 1314, 1316, 1326, 1328, 1320) to the lumislice system architecture 1300, with the synthesized scene 1338 as the output from the lumislice system architecture 1300. From a parameterized surface describing the desired knitwear shape that is input to the lumislice system architecture 1300 at Action 1302, control points for the shape are determined at Action 1304. An example of a parameterized surface is seen in FIG. 2a, and an example of control points connected by axes is seen in FIG. 2b. Knitting and color patterns are input to the lumislice system architecture 1300 at Action 1306, which are placed along the control points determined at Action 1304 to form a skeleton of the yarn stitches at Action 1308. An example of a yarn stitch skeleton is seen in FIG. 2c. The yarn stitch skeleton determined at Action 1308 is then discretized into yarn segments at Action 1310. For a given viewing condition, the yarn segments from Action 1310 are sorted by distance from the viewer at Action 1320. The unsorted yarn segments from Action 1310 are also used with the scene geometry input at Action 1314 and also with a lighting condition input at Action 1316 to compute the shadow map of the scene at Action 1324 as described above in Subsection 1.1.2.4.3. A lumislice is computed at Action 1324 from several inputs, including the fiber distribution of the yarn cross-section that is input at Action 1326, as well as the slice resolution and the sampling density for the lumislice which are respectively input to the lumislice system architecture 1300 at Actions 1328 and 1330. The shadow map computed at Action 1324, the yarn segments sorted at Action 1320, and the conditions of viewing and lighting input at Actions 1314, 1316 are used along with the lumislice computed at Action 1324 for rendering the synthesized scene of the knitwear at Action 1338. An example of the rendered knitwear is seen in FIGS. 6, 15a, 15b, and 16a–16d.

1.2.4.6 Rendering Algorithm

From the implementations described above, actions to implement a rendering algorithm are presented in this Subsection 1.2.4.5, wherein the given models of the lumislice and the knitwear skeleton are used.

FIG. 14 depicts an implementation of a rendering routine 1400. Rendering routine 1400 includes an Action 1402 that creates a shadow map. The process to create a shadow map is as described in Subsection 1.2.4.3, above. At Action 1404, an ID color method is used to draw the color and depth of geometric objects as seen from the viewport into a 1$^{st}$ Image Buffer. In Action 1406, the result of the geometric objects in the 1st Image Buffer is drawn as cylindrical polygons. The resulting image in the 1st Image Buffer is then converted into a bitmap. Pixels that are covered by yarn are set to 0, and others are set to 1.

At Action 1408, geometric objects are drawn with the shadow test under the same projection condition. The result is then saved in a 2nd Image Buffer. Yarn segments that were discretized at Action 1310 of FIG. 13 are then sorted by depth or distance from the viewpoint at Actions 1320, 1410, respectively, of FIGS. 13 and 14. At Action 1412, the depth test is disabled. The use of hardware-aided graphics APIs entails the masking or disabling of the z-buffer depth test for accurate transparency-blending computation. Consequently, the rendering of a scene in this implementation can require more than one action. After this disabling of the z-buffer depth test, the volumetric yarn is drawn on the result of Action 1408.

Before each slice is rendered, the vertices of each slice are projected into the 1st Image Buffer. If the slice is totally occluded by geometric objects, the slice is not rendered. Then all slices of the yarn segments are rendered going from the far slices to the near slices. The results is then saved in the 3rd Image Buffer at Action 1412.

For every pixel in the 3rd Image Buffer, a check is made as to its corresponding value in the 1st Image Buffer at Action 1414. If the value is 1, then the pixel should display a geometric object, so the color of this pixel is replaced by the color of the corresponding pixel in the 2nd Image Buffer so as to properly process slices that are partially occluded. The final result is obtained after all the pixels are checked. The scene can then be synthesized, as in Action 1338 of FIG. 13.

From the summary, those of skill in the art of textile modeling will appreciate that lumislice-based implementations for knitwear modeling have the following advantages:
 fine-level interaction among yarn fibers can be precomputed and used throughout a piece of knitwear;
 different levels of detail for varying viewing distances are handled by multiresolution lumislices, in a manner similar to mip-maps;
 a knitwear skeleton can be created on a free-form surface, which facilitates physically based animation and other applications;
 the lumislice can be used for rendering arbitrary stitch patterns with better visual effects and lower cost than ray tracing. Existing volumetric representation methods have significant difficulties in dealing with complex stitches on a deformable surface; and
 implementations of the lumislice can be implemented by standard graphics application program interfaces (APIs), such as Open Graphics Language (OpenGL).

Exemplary Computing System and Environment

Figure 17:
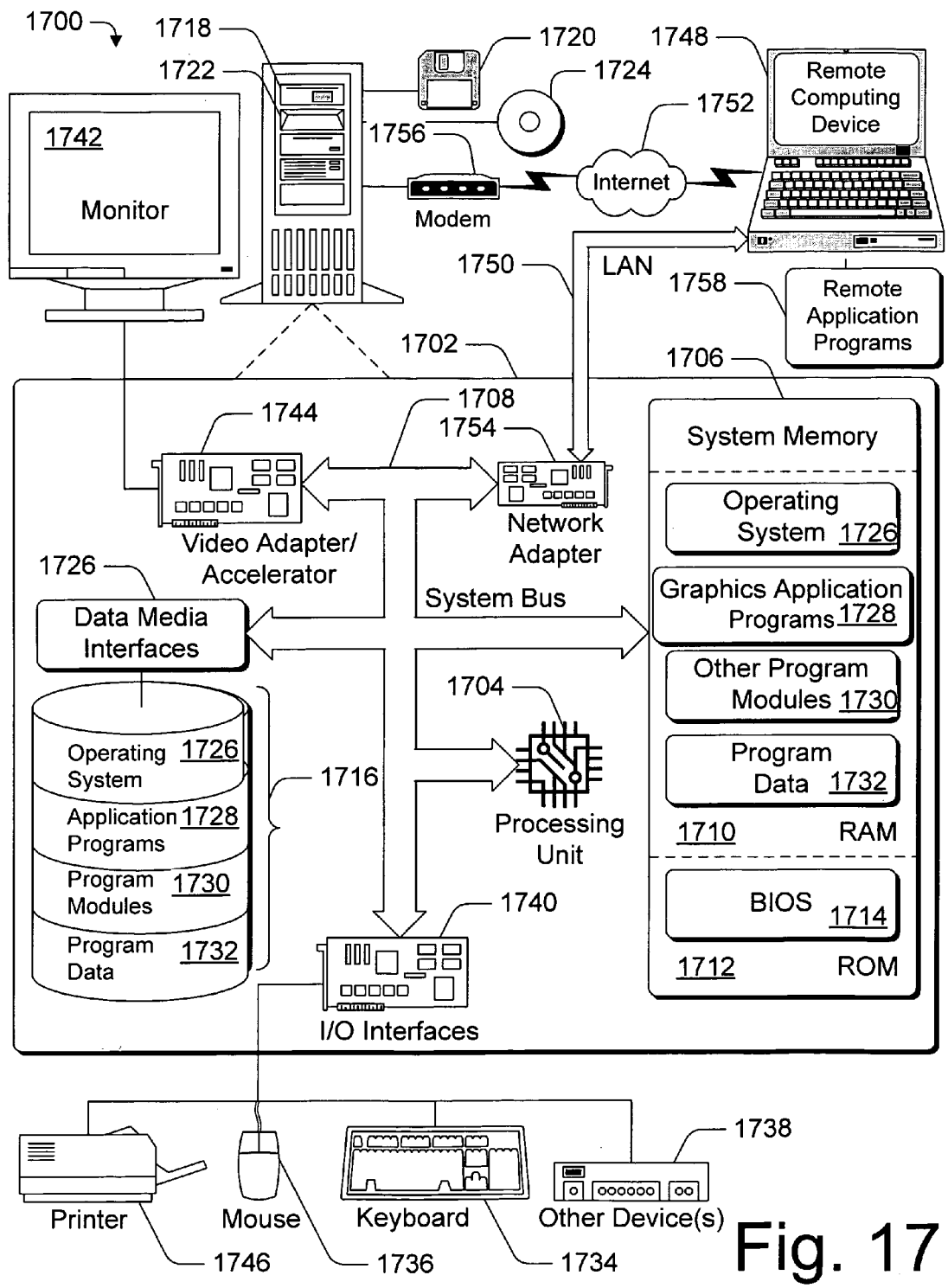
FIG. 17 is an illustrative example of a computing operating environment capable of implementing, either wholly or partially, a lumislice algorithm.

FIG. 17 illustrates an example of a suitable computing environment 1700 within which the macrostructure modeling with microstructure reflectance slices system and method, as described herein, may be implemented (either fully or partially). The computing environment 1700 may be utilized in the computer and network architectures described herein.

The exemplary computing environment 1700 is only one example of a computing environment and is not intended to suggest any limitation as to the scope of use or functionality of the computer and network architectures. Neither should the computing environment 1700 be interpreted as having any dependency or requirement relating to any one or combination of components illustrated in the exemplary computing environment 1700.

The macrostructure modeling with microstructure reflectance slices system and method may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The macrostructure modeling with microstructure reflectance slices system and method may be described in the general context of computer-executable instructions, such as program modules, being executed by a computer. Generally, program modules include routines, programs, objects, components, data structures, etc. that perform particular tasks or implement particular abstract data types. The macrostructure modeling with microstructure reflectance slices system and method may also be practiced in distributed computing environments where tasks are performed by remote processing devices that are linked through a communications network. In a distributed computing environment, program modules may be located in both local and remote computer storage media including memory storage devices.

The computing environment 1700 includes a general-purpose computing device in the form of a computer 802. The components of computer 1702 can include, but are not limited to, one or more processors or processing units 1704, a system memory 1706, and a system bus 1708 that couples various system components including the processor 1704 to the system memory 1706.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1702 typically includes a variety of computer readable media. Such media can be any available media that is accessible by computer 1702 and includes both volatile and non-volatile media, removable and non-removable media.

The system memory 1706 includes computer readable media in the form of volatile memory, such as random access memory (RAM) 1710, and/or non-volatile memory, such as read only memory (ROM) 1712. A basic input/output system (BIOS) 1714, containing the basic routines that help to transfer information between elements within computer 1702, such as during start-up, is stored in ROM 1712. RAM 1710 typically contains data and/or program modules that are immediately accessible to and/or presently operated on by the processing unit 1704. System memory 1706 is an example of a means for storing data having inputs and outputs and a frame buffer for storing pixel representations from which to render a three-dimensional graphical object.

Computer 1702 may also include other removable/non-removable, volatile/non-volatile computer storage media. By way of example, FIG. 17 illustrates a hard disk drive 1716 for reading from and writing to a non-removable, non-volatile magnetic media (not shown), a magnetic disk drive 1718 for reading from and writing to a removable, non-volatile magnetic disk 1720 (e.g., a "floppy disk"), and an optical disk drive 1722 for reading from and/or writing to a removable, non-volatile optical disk 1724 such as a CD-ROM, DVD-ROM, or other optical media. The hard disk drive 1716, magnetic disk drive 1718, and optical disk drive 1722 are each connected to the system bus 1708 by one or more data media interfaces 1726. Alternatively, the hard disk drive 1716, magnetic disk drive 1718, and optical disk drive 1722 can be connected to the system bus 1708 by one or more interfaces (not shown).

The disk drives and their associated computer-readable media provide non-volatile storage of computer readable instructions, data structures, program modules, and other data for computer 1702. Although the example illustrates a hard disk 1716, a removable magnetic disk 1720, and a removable optical disk 1724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1716, magnetic disk 1720, optical disk 1724, ROM 1712, and/or RAM 1710, including by way of example, an operating system 1726, one or more graphics application programs 1728, other program modules 1730, and program data 1732. Each of such operating system 1726, one or more graphics application programs 1728, other program modules 1730, and program data 1732 (or some combination thereof) may include an embodiment of program code to perform the macrostructure modeling with microstructure reflectance slices system and method.

A user can enter commands and information into computer 1702 via input devices such as a keyboard 1734 and a pointing device 1736 (e.g., a "mouse"). Other input devices 1738 (not shown specifically) may include a microphone, joystick, game pad, satellite dish, serial port, scanner, and/or the like. These and other input devices are connected to the processing unit 1704 via input/output interfaces 1740 that are coupled to the system bus 1708, but may be connected by other interface and bus structures, such as a parallel port, game port, or a universal serial bus (USB).

A monitor 1742 or other type of display device can also be connected to the system bus 1708 via an interface, such as a video adapter/accelerator 1744. Video adapter/accelerator 1744 is intended to have a component thereof that represents 3-D commodity graphics hardware. As such, the 3-D commodity graphics hardware is coupled to the high-speed system bus 1706. The 3-D commodity graphics hardware may be coupled to the system bus 1708 by, for example, a cross bar switch or other bus connectivity logic. It is assumed that various other peripheral devices, or other buses, may be connected to the high-speed system bus 1708, as is well known in the art. Further, the 3-D commodity graphics hardware may be coupled through one or more other buses to system bus 1708.

In addition to the monitor 1742, other output peripheral devices can include components such as speakers (not shown) and a printer 1746 which can be connected to computer 1702 via the input/output interfaces 1740.

Computer 1702 can operate in a networked environment using logical connections to one or more remote computers, such as a remote computing device 1748. By way of example, the remote computing device 1748 can be a personal computer, portable computer, a server, a router, a network computer, a peer device or other common network node, and the like.

The remote computing device 1748 is illustrated as a portable computer that can include many or all of the elements and features described herein relative to computer 1702. Logical connections between computer 1702 and the remote computer 1748 are depicted as a local area network (LAN) 1750 and a general wide area network (WAN) 1752. Such networking environments are commonplace in offices, enterprise-wide computer networks, intranets, and the Internet.

When implemented in a LAN networking environment, the computer 1702 is connected to a local network 1750 via a network interface or adapter 1754. When implemented in a WAN networking environment, the computer 1702 typically includes a modem 1756 or other means for establishing communications over the wide network 1752. The modem 1756, which can be internal or external to computer 1702, can be connected to the system bus 1708 via the input/output interfaces 1740 or other appropriate mechanisms. It is to be appreciated that the illustrated network connections are exemplary and that other means of establishing communication link(s) between the computers 1702 and 1748 can be employed.

In a networked environment, such as that illustrated with computing environment 1700, program modules depicted relative to the computer 1702, or portions thereof, may be stored in a remote memory storage device. By way of example, remote application programs 1758 reside on a memory device of remote computer 1748. For purposes of illustration, application programs and other executable program components such as the operating system are illustrated herein as discrete blocks, although it is recognized that such programs and components reside at various times in different storage components of the computing device 1702, and are executed by the data processor(s) of the computer.

Computer-Executable Instructions

An implementation of the macrostructure modeling with microstructure reflectance slices system and method may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 17 illustrates an example of a suitable operating environment 1700 in which an exemplary macrostructure modeling with microstructure reflectance slices system and method may be implemented. Specifically, the exemplary macrostructure modeling with microstructure reflectance slices system and method described herein may be implemented (wholly or in part) by any program modules 1728–1730 and/or operating system 1726 in FIG. 17 or a portion thereof.

The operating environment is only an example of a suitable operating environment and is not intended to suggest any limitation as to the scope or use of functionality of the exemplary macrostructure modeling with microstructure reflectance slices system and method described herein.

Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary macrostructure modeling with microstructure reflectance slices system and method may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

For purposes of the explanation, specific numbers, materials and configurations are set forth above in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, and thereby better explain the present invention. Furthermore, for ease of understanding, certain method operations are delineated as separate operations; however, these separately delineated operations should not be construed as necessarily order dependent in their performance.

The inventors intend these exemplary implementations to be examples and not to limit the scope of the present invention. Rather, the inventors have contemplated that the present invention might also be embodied and implemented in other ways, in conjunction with other present or future technologies.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system, comprising:
    an operating system for a computing device; and
    a graphics application program
        for moving a semitransparent plane including a plurality of reflection points relative to an axis, and
        for rendering an image of the plurality of reflection points at a plurality of positions with respect to the axis such that each said point maps an elongated, continuous image.

2. The system as defined in claim 1, wherein moving the semitransparent plane including the plurality of reflection points relative to the axis comprises rotating the plane about, and translating the plane with respect to, the axis.

3. The system as defined in claim 1, wherein moving the semitransparent plane including the plurality of the reflection points relative to the axis comprises moving the plane of the reflection points perpendicular with respect to the axis.

4. The system as defined in claim 3, wherein moving the semitransparent plane including the plurality of the reflection points perpendicular with respect to the axis further comprising rotating the plane about, and translating the plane with respect to, the axis.

5. The system as defined in claim 1, wherein rendering the image comprises rendering a 3D model from a combination of images of the plurality of reflection points at a plurality of positions with respect to the axis.

6. The system as defined in claim 1, wherein:
    a plurality of control points, each being located at an intersection of two axes, define a three-dimensional (3D) surface of a macrostructure;
    the graphics application program rotates and translates the plane of the reflection points respectively about and along each said axis of the 3D surface of the macrostructure; and
    the graphics application program renders a 3D model from a plurality of images of a plurality of positions of the planar plurality of reflection points with respect to each said axis of the 3D surface of the macrostructure.

7. The system as defined in claim 1, further comprising a computer-readable medium including computer-executable instructions comprising the graphics application program.

8. A system, comprising:
    an operating system for a computing device; and
    a graphics application program
        for moving a plurality of voxels contained within parallel opposing planes with respect to an axis that is perpendicular to the parallel opposing planes, each said voxel being semitransparent and having a reflectance factor and a plurality of reflection points having a density, and
        for rendering an image of the plurality of voxels at a plurality of positions with respect to the axis such that at least one said point maps an elongated, continuous image.

9. The system as defined in claim 8, wherein the graphics application program rotates the parallel opposing planes about, and translating the parallel opposing planes with respect to, the axis.

10. The system as defined in claim 8, wherein the graphics application program moves the plurality of voxels contained within parallel opposing planes perpendicular with respect to the axis.

11. The system as defined in claim 10, wherein the graphics application program rotates the plurality of voxels contained within parallel opposing planes about, and translating the plurality of voxels contained within parallel opposing planes with respect to, the axis.

12. The system as defined in claim 8, wherein:
rendering the image comprises rendering a 3D model from a combination of images of the plurality of reflection points at a plurality of positions with respect to the axis; and
the rendered image accounts for the interaction of each said reflectance factor of each said voxel with respect to the other voxels of the plurality of voxels at each said position of said plurality of positions.

13. The system as defined in claim 8, wherein:
a plurality of control points, each being located at an intersection of two axes, define a three-dimensional (3D) surface of a macrostructure;
the graphics application program rotates and translates the plane of the reflection points respectively about and along each said axis of the 3D surface of the macrostructure; and
the graphics application program renders a 3D model from a plurality of image of a plurality of positions of the planar plurality of reflection points with respect to each said axis of the 3D surface of the macrostructure.

14. The system as defined in claim 8, wherein each of the voxels has an associated opacity and voxel reflectance function (VRF).

15. The system as defined in claim 14, wherein:
the VRF represents the brightness of a voxel viewed from direction $V(\theta_v, \phi_v)$ when illuminated by a unit intensity light from direction $L(\theta_l, \phi_l)$;
the VRF is represented by a four-dimensional color array after discretization of the four angles $\theta_l, \phi_l, \theta_v, \phi_v$;
$\theta$ is a longitude angle; and
$\phi$ is an altitude angle.

16. The system as defined in claim 15, wherein:
the discretization of the four angles $\theta_l, \phi_l, \theta_v, \phi_v$ comprises the discretization into directional increments;
the directional increments for the longitude angle are $\theta \epsilon [0, 2\pi]$; and
the directional increments of the altitude angle are $\phi_l \epsilon [-\pi/2, \pi/2]$.

17. The system as defined in claim 1, further comprising a computer-readable medium including computer-executable instructions comprising the graphics application program.

18. A system, comprising:
an operating system for a computing device; and
a graphics application program for rendering knitwear, further comprising one or more program modules
for generating a parameterized surface describing a three-dimensional (3D) knitwear macrostructure;
for determining a plurality of control points that define the parameterized surface, wherein each said control point is located at an intersection of two axes;
for applying a stitch pattern to each of the control points of the knitwear skeleton to form a skeleton of the yarn stitches;
for discretizing the skeleton of the yarn stitches into a plurality of discretized yarn segments;
for sorting the discretized yarn segments according to a viewing condition of a scene including the knitwear macrostructure and a distance of a view of the scene;
for inputting the plurality of discretized yarn segments into:
a geometry of the scene; and
a lighting condition of the scene;
for applying a lumislice, with respect to a resolution of the distance of the view of the scene and a sampling density, to each stitch of the stitch pattern of the sorted discretized yarn segments by translating and rotating the lumislice perpendicular to and respectively along and about each stitch of the stitch pattern applied to the plurality of intersecting axes, wherein the lumislice is semitransparent and is computed from a fiber distribution of a yarn cross-section; and
for rendering a synthesis of the scene including the knitwear macrostructure using the sorted discretized yarn segments having the lumislice applied thereto, the viewing condition of the scene, and the distance of the view of the scene.

19. The system of claim 18, wherein applying a stitch pattern to each of the control points of the knitwear skeleton to form a skeleton of the yarn stitches further comprises applying a color pattern to each of the control points of the knitwear skeleton to form the skeleton of the yarn stitches.

20. The system of claim 18, further comprising a program module for computing, before applying the lumislice, a shadow map from the geometry of the scene and the lighting condition, wherein the synthesis of the scene is rendered using the computed shadow map.

21. The system of claim 18, wherein:
each said lumislice characterizes attributions of a cross-sectional slice of yarn of the yarn stitches that is divided into voxels; and
each of the voxels has an associated opacity and voxel reflectance function (VRF).

22. The system as defined in claim 21, wherein:
the VRF represents the brightness of a voxel viewed from direction $V(\theta_v, \phi_v)$ when illuminated by a unit intensity light from direction $L(\theta_l, \phi_l)$;
the VRF is represented by a four-dimensional color array after discretization of the four angles $\theta_l, \phi_l, \theta_v, \phi_v$;
$\theta$ is a longitude angle; and
$\phi$ is an altitude angle.

23. The system as defined in claim 22, wherein:
the discretization of the four angles $\theta_l, \phi_l, \theta_v, \phi_l$ comprises the discretization into directional increments;
the directional increments for the longitude angle are $\theta \epsilon [0, 2\pi]$; and
the directional increments of the altitude angle are $\phi \epsilon [-\pi/2, \pi/2]$.

* * * * *